United States Patent [19]

Lumsden

[11] Patent Number: 5,259,034

[45] Date of Patent: Nov. 2, 1993

[54] VOICE OVER CIRCUITRY WITH ADJUSTABLE DEPTH OF FADE

[75] Inventor: John L. Lumsden, Boca Raton, Fla.

[73] Assignee: Sony Electronics Inc., Park Ridge, N.J.

[21] Appl. No.: 798,181

[22] Filed: Nov. 26, 1991

[51] Int. Cl.$^5$ .............................................. H03G 3/00
[52] U.S. Cl. ..................................... 381/109; 381/119
[58] Field of Search ........................ 381/119, 109, 104

[56] References Cited

U.S. PATENT DOCUMENTS

| | | |
|---|---|---|
| 3,932,886 | 1/1976 | Olms et al. . |
| 4,067,049 | 1/1978 | Kelly et al. . |
| 4,479,240 | 10/1984 | McKinley ........................ 381/109 |
| 4,555,737 | 11/1985 | Heitmann . |
| 4,839,733 | 6/1989 | Karamon et al. . |
| 4,858,033 | 8/1989 | Chippendale . |

FOREIGN PATENT DOCUMENTS 9118456  11/1991  PCT Int'l Appl. .

OTHER PUBLICATIONS

Chamberlin, "Musical Applications of Microprocessors", 1980, pp. 268, 269.

Primary Examiner—Forester W. Isen
Attorney, Agent, or Firm—Ronald P. Kananen

[57] ABSTRACT

A voice over circuitry comprises a comparator for comparing a fader signal to a predetermined threshold level which may be determined during a rehearsal. The output of the comparator is connected to a two part display. When the fader signal is greater than the threshold level, the first part of the display is activated and when the fader level is less than the threshold level the second part of the display is activated. Neither of the two parts of the display are activated when the fader signal equals the threshold level. Based on the state of the display, the fader signal is adjusted as necessary to equal the threshold level. Thus, the mixing fader may be set quickly, accurately and consistently to the desired depth of fade during a mixing session.

8 Claims, 2 Drawing Sheets

VOICE OVER CIRCUITRY WITH ADJUSTABLE DEPTH OF FADE

BACKGROUND OF INVENTION

1. Field of the Invention

This invention relates to an apparatus and method for fading in a mixing console and, more particularly, to an apparatus and method for accurately and consistently fading to a pre-set reference level with the use of two separate displays.

2. Description of Prior Art

Frequently, a mixing console is used to create a "voice over" in video productions and post-productions, such as in the production of a commercial. While performing a "voice over", it is difficult for an operator to consistently fade the signal to a desired level.

Previous attempts have been directed to fixing the fader at a desired level. For instance, U.S. Pat. No. 4,677,674 to Snyder discloses an apparatus and method for setting a mixing fader at a predetermined level comprised of determining the desired level and then transmitting a test signal through the input channel and recording the level of the test signal at the output channel. If, after the setting of the fader has changed, the original setting of the mixing fader is then desired, a second test signal is sent through the input channel and the output of the output channel is compared to the previously recorded test signal output. The mixing fader is then adjusted until the test signal at the output channel equals the previously recorded output of the test signal.

As is apparent from the above description, the prior art setting of the predetermined reference level is rather complex. Also, each time the fader needs to be subsequently set at the predetermined level, a test signal must be injected into the channel and the output signal adjusted to equal the previously recorded level. Once a mixing fader has been set, however, any movement of the fader will accordingly change the output level. Thus, although Snyder enables a mixer to be set at a predetermined level, it is still difficult to fade to the predetermined level during a mixing session Thus, it is a problem in the art of mixing to be able to consistently and quickly fade to a desired level. It is another problem in the art of mixing to consistently and accurately fade to a desired level.

SUMMARY OF THE INVENTION

It is an object of the present invention to provide a mixer in which fading to a predetermined level is easily and quickly accomplished.

It is another object of the present invention to enable a mixing session to be rehearsed so that a desired depth of fade may be determined.

It is still another object of the present invention to provide a display which accurately displays the relationship between a fader signal and a predetermined threshold level.

It is yet a further object of the present invention to provide a mixer in which consistent and accurate results are obtainable.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, voice over circuitry with an adjustable depth of fade may comprise a threshold setting apparatus which sets a minimum threshold level for the depth of fade during a rehearsed session. During a mixing session, a comparator compares this threshold level to a fader signal and outputs the difference to a display. Preferably, the display is comprised of two LEDs, with the first LED activated when the fader signal is greater than the threshold level and the second LED activated when the fader signal is less than the threshold level. When the fader level equals the threshold level, neither LED is activated. A voltage controlled amplifier ("VCA") receives the fader signal and a signal which is based upon an editor ramp voltage and the threshold voltage. The two signals received by the VCA accordingly determine the amplification of the input signal. The output of the VCA may be applied to the left and right mixing busses.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings.

DETAILED DESCRIPTION OF THE PREFERRED EMBODIMENT

Reference will now be made in detail to the preferred embodiment of the invention, an example of which is illustrated in the accompanying drawings.

Figure 1:
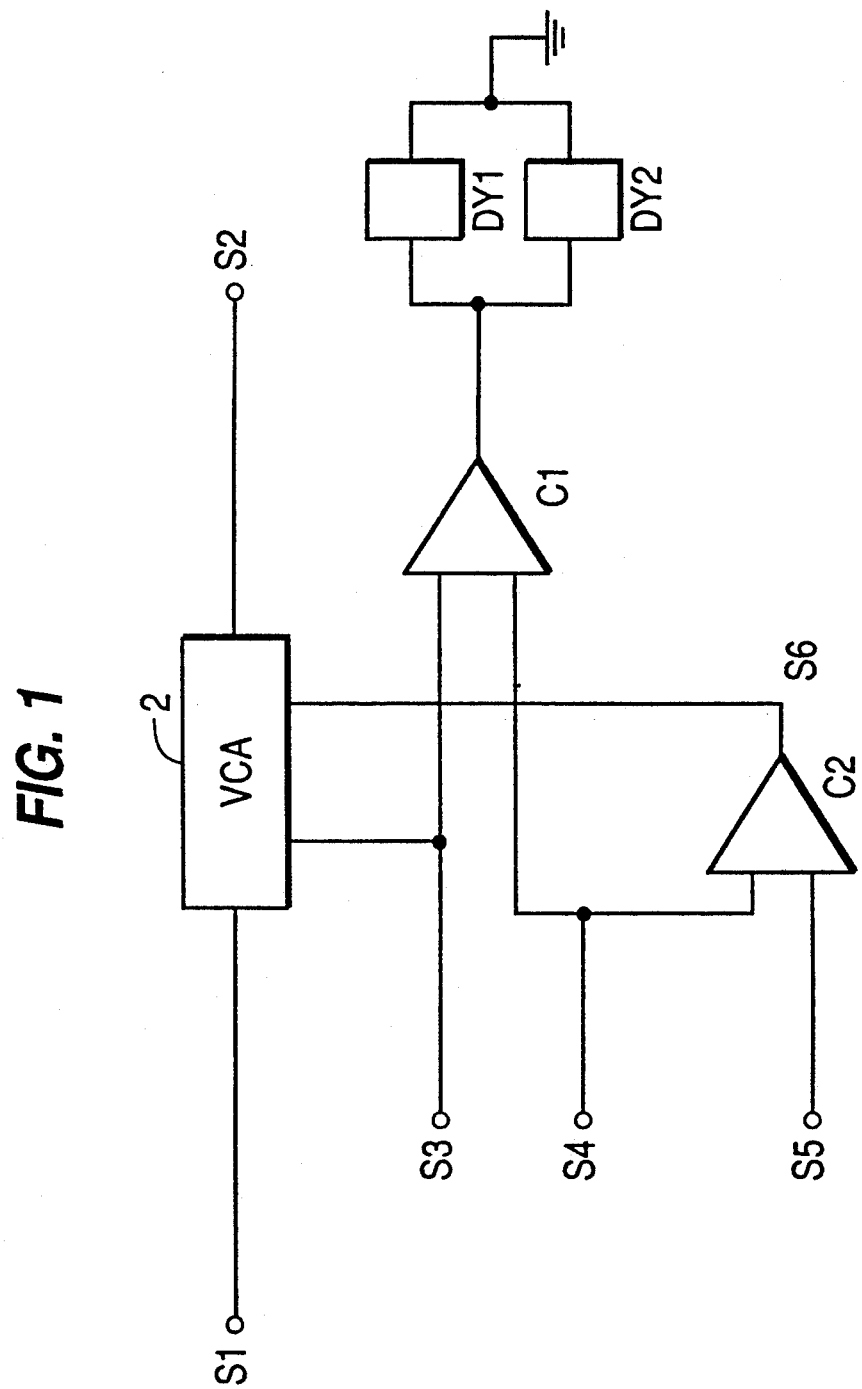
FIG. 1 is a schematic diagram of the voice over circuitry with a depth of fade.

As illustrated in FIG. 1, the voice-over circuitry with an adjustable depth of fade comprises an amplifier 2 for amplifying an input signal S1 according to two control signals S3 and S6. The amplifier 2 is preferably a voltage controlled amplifier (VCA) which sets the gain of an output signal S2 according to two control signals S3 and S6. Signal S3 is the output signal of a mixing fader. A comparator C2 compares an editor ramp voltage S5 with a predetermined threshold level S4 and outputs the second control signal S6. The output of the VCA may then be sent to left and right mixing busses.

The predetermined threshold level S4 is set during a rehearsal according to the desired depth of fade. In order to fade to that predetermined level, a comparator C1 outputs the difference between the fader signal S3 and the predetermined level S4. The output of the comparator C1 is connected to a first indicator DY1 and a second indicator DY2. When the fader signal S3 is greater than the threshold level S4, the first indicator DY1 is activated and the second indicator DY2 is not; when the fader signal S3 is less than the threshold level S4, indicator DY2 is activated and DY1 is not. Preferably, neither the first indicator DY1 nor the second indicator DY2 is activated when the fader signal S3 equals the threshold level S4. The use of the two indicators allows an operator to consistently and quickly fade to the predetermined threshold level S4 by knowing whether the fader signal S3 is above or below the desired level.

Figure 2:
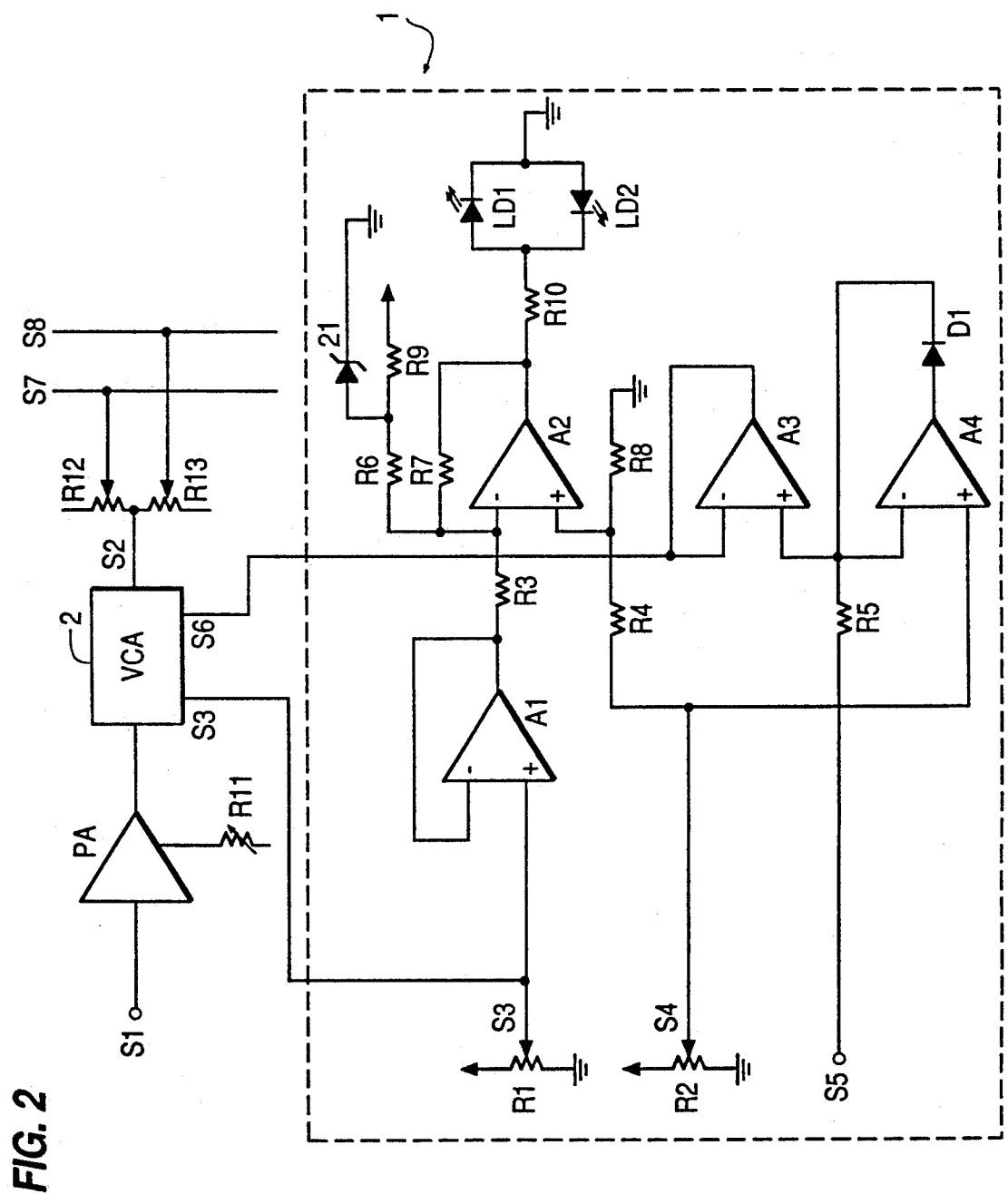
FIG. 2 illustrates an embodiment of the circuitry for the schematical diagram of FIG. 1.

FIG. 2 illustrates a preferred embodiment of the voice over circuitry 1 having an adjustable depth of fade. In FIG. 2, a preamplifier PA receives an input signal S1 and supplies the preamplified input to a voltage controlled amplifier (VCA) 2. The gain of the preamplifier is adjustable by potentiometer R11 or other similar structure. The gain of the VCA 2 is determined by the two control signals S3 and S6. The output of the VCA 2 is a signal S2 which is provided to the left and right mixing busses S7 and S8 via panning resistors R12 and R13.

An adjustable resistance R1 represents a mixing fader for creating a fader signal S3. A predetermined threshold level S4 is previously set to a desired level by the position of an adjustable resistance R2. The fader signal S3 is buffered by amplifier A1 and is sent through a resistor R3 to the inverting input of an op-amp A2. Resistors R6 and R9 and zenor diode Z1 bias the voltage of the fader signal S3. The threshold voltage S4 is divided by a voltage divider consisting of resistors R4 and R8 and is applied to the non-inverting input of op-amp A2. The gain of the amplifier A2 is set by resistances R7 and R3.

The output of the amplifier A2 is supplied to a load resistance R10 and to the parallel connection of LED's LD1 and LD2, which are biased reversely to each other. In this embodiment, LD1 and LD2 are the first and second indicators. Thus, when the fader signal S3 is greater than the threshold level S4 the first LED LD1 is activated, and when the fader signal S3 is less than the threshold level S4 the second LED LD2 is activated. Finally, when the fader signal S3 equals the threshold level S4, neither LED LD1 nor LD2 is activated.

An editor ramp voltage S5 is applied to an inverting input of an op-amp A4 through a resistance R5. The threshold level S4 is supplied to the non-inverting input of op-amp A4, which with diode D1, clamps the minimum value of the second control signal S6 at the threshold level S4. The output of op-amp A4 is sent through a buffer amplifier A3 to the VCA 2.

The operation of the voice over circuitry is as follows. During a rehearsal, the depth of fade is set by varying the value of the adjustable resistor R2. Then, while fading during a mixing session, the value of the fader signal S3 is set by an operator through the adjustable resistance R1 to equal the threshold level S4. While setting the fader signal S3, when the first LED LD1 is activated, the operator is informed that the fader signal is above the threshold level S4. This causes the operator to adjust the fader position downwardly so that the fader signal S3 is lowered until both LEDs LD1 and LD2 are turned off. If the second LED LD2 is activated, the operator is informed that the fader signal is at a value less than the threshold level S4. This causes the operator to adjust the fader position upwardly so that the fader signal S3 is raised until both LEDs LD1 and LD2 are turned off. With appropriate circuit justification, the adjustment of the fader signal S3 may also be performed automatically based upon, for instance, the output of the op-amp A2.

The present invention overcomes the disadvantages of the prior art by enabling an operator to determine the desired depth of fade and to accurately fade to the desired depth. A two part indicator informs the operator as to the relationship between the fader signal S3 and the threshold level S4. The present invention also allows the operator to consistently fade to this predetermined reference level.

The foregoing description of a preferred embodiment of the invention has been presented for purposes of illustration and description. It is not intended to be exhaustive or to limit the invention to the precise form disclosed. Many modifications and variations are possible in light of the above teaching. For example, other types of indicators and other numbers of indicators may be used for indicating the relationships between the fader signal and the desired level. For instance, various audible indicators or visible indicators may be used and/or other relationships may be indicated, such as indicating when the fader signal is within a certain range from the threshold level Also, more than one LED may be used as LD1 and LD2. Although a VCA has been shown, other types of amplifiers may be used in its place. Finally, an op-amp has been used only as an example of a means for comparing the desired level and the fader signal. The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. An apparatus in a mixing console for adjusting the depth of fade of a signal comprising:
    (a) amplifier means for amplifying an input signal to create an output signal based upon at least a first control signal;
    (b) threshold setting means for setting a reference level corresponding to a desired depth of fade of said input signal;
    (c) fader means for generating an adjustable signal which is supplied at least to said amplifier means as said first control signal;
    (d) comparator means for comparing said adjustable signal with said reference level and for outputting a difference signal;
    (e) indicator means, comprising a first indicator and a second indicator, for receiving said difference signal and causing said first and second indicators to be operable in a first state when said adjustable signal is greater than said reference level, in a second state when said adjustable signal is less than said reference level, and in a third state when said adjustable signal equals said reference level; and
    (f) means for generating an editor signal and means for clamping said editor signal at said reference level and for thereby creating a second control signal which is received at said amplifier means;
    whereby said adjustable signal can be adjusted to said reference level based on the state of said display.

2. The apparatus for adjusting the depth of fade as set forth in claim 1, wherein said first and second indicators comprise a first LED and a second LED, wherein said first LED is reverse biased with respect to said second LED.

3. The apparatus for adjusting the depth of fade as set forth in claim 1, wherein said amplifier means is a voltage controlled amplifier and wherein said output signal is sent to one or more mixing busses.

4. The apparatus for adjusting the depth of fade as set forth in claim 1, wherein said reference level is a predetermined level set by an operator during a rehearsal and represents a desired depth of fade and wherein said fader means is adjusted during an edit session so that said first control signal equals said reference level.

5. The apparatus for adjusting the depth of fade as set forth in claim 1, wherein in said first state said first indicator is activated and said second indicator is not, in said second state said second indicator is activated and said first indicator is not, and in said third state neither said first indicator nor said second indicator is activated.

6. The apparatus for adjusting the depth of fade as set forth in claim 1, wherein said threshold setting means and said fader means comprise adjustable resistances.

7. An apparatus in a mixing console for adjusting the depth of fade of a signal comprising:
   (a) amplifier means for amplifying an input signal to create an output signal based upon at least a first control signal;
   (b) manually adjustable threshold setting means for setting a reference level corresponding to a desired depth of fade of said input signal;
   (c) manually adjustable fader means for generating an adjustable signal which is supplied at least to said amplifier means as said first control signal;
   (d) comparator means for comparing said adjustable signal with said reference level and for outputting a difference signal;
   (e) indicator means, comprising a first indicator and a second indicator, for receiving said difference signal and causing said first and second indicators to be operable in a first state when said adjustable signal is greater than said reference level, in a second state when said adjustable signal is less than said reference level, and in a third state when said adjustable signal equals said reference level; and
   (f) means for generating an editor signal and means for clamping said editor signal at said reference level and for thereby creating a second control signal which is received at said amplifier means;
   whereby said adjustable signal can be adjusted to said reference level based on the state of said display.

8. The apparatus for adjusting the depth of fade as set forth in claim 7, wherein said manually adjustable threshold setting means and said fader means comprise adjustable resistances.

* * * * *